(12) United States Patent
Hyde et al.

(10) Patent No.: US 8,279,066 B2
(45) Date of Patent: Oct. 2, 2012

(54) METHOD AND APPARATUS FOR TRACKING PLANTS WITH ELECTRONIC TAG

(75) Inventors: Roderick A. Hyde, Redmond, WA (US); Muriel Y. Ishikawa, Livermore, CA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 249 days.

(21) Appl. No.: 12/077,066

(22) Filed: Mar. 14, 2008

(65) Prior Publication Data

US 2009/0231099 A1 Sep. 17, 2009

(51) Int. Cl.
*G08B 13/14* (2006.01)
(52) U.S. Cl. ............... 340/572.1; 340/10.1; 340/539.1; 47/1.01 R
(58) Field of Classification Search .... 340/572.1–572.8, 340/539.1; 47/1.01 R
See application file for complete search history.

(56) References Cited

U.S. PATENT DOCUMENTS

| | | | |
|---|---|---|---|
| 4,379,372 A * | 4/1983 | Alexander et al. | 40/645 |
| 4,570,368 A * | 2/1986 | Stover | 40/645 |
| 4,972,616 A * | 11/1990 | Doll | 40/645 |
| 5,339,517 A * | 8/1994 | Diemer | 29/809 |
| 6,597,465 B1 | 7/2003 | Jarchow et al. | |
| 6,671,698 B2 | 12/2003 | Pickett et al. | |
| 6,701,665 B1 | 3/2004 | Ton et al. | |
| 6,745,127 B2 | 6/2004 | Crosby | |
| 6,888,458 B2 * | 5/2005 | Carlson | 340/540 |
| 6,963,881 B2 * | 11/2005 | Pickett et al. | 1/1 |
| 7,076,900 B2 * | 7/2006 | Faulkner | 40/645 |
| 7,080,577 B2 | 7/2006 | Latschbacher et al. | |
| 7,143,066 B2 | 11/2006 | Shear et al. | |
| 7,233,250 B2 | 6/2007 | Forster | |
| 7,316,202 B2 * | 1/2008 | Fantin et al. | 119/174 |
| 7,403,855 B2 | 7/2008 | Fuessley et al. | |
| 7,702,462 B2 | 4/2010 | Fuessley et al. | |
| 7,761,334 B2 | 7/2010 | Pickett et al. | |
| 7,798,746 B2 | 9/2010 | Byles | |
| 2001/0029996 A1 | 10/2001 | Robinson | |
| 2002/0170229 A1 | 11/2002 | Ton et al. | |
| 2003/0066234 A1 | 4/2003 | Bussey, Jr. | |

(Continued)

FOREIGN PATENT DOCUMENTS

JP 2006101739 A 4/2006

(Continued)

OTHER PUBLICATIONS

Data Identifier and Application Identifier Standard, American National Standard, Material Handling Industry (Oct. 9, 2006), pp. 1-110.

*Primary Examiner* — Eric M Blount
(74) *Attorney, Agent, or Firm* — Workman Nydegger

(57) ABSTRACT

One or more plants may be associated with an electronic tag including a memory circuit and interrogation interface. The memory circuit in the electronic tag may include data corresponding to the one or more plants. According to an embodiment the data may include plant care information such as a record of treatments received by the one or more plants and/or plant care instructions. The data may be structured.

50 Claims, 7 Drawing Sheets

U.S. PATENT DOCUMENTS

| | | |
|---|---|---|
| 2004/0088330 A1* | 5/2004 | Pickett et al. ............... 707/104.1 |
| 2004/0088916 A1* | 5/2004 | Ton et al. .................... 47/58.1 R |
| 2005/0134461 A1 | 6/2005 | Gelbman et al. |
| 2006/0022824 A1 | 2/2006 | Olsen, III et al. |
| 2006/0080819 A1 | 4/2006 | McAllister |
| 2006/0085266 A1 | 4/2006 | Wei et al. |
| 2006/0116791 A1 | 6/2006 | Ravula et al. |
| 2006/0220955 A1 | 10/2006 | Hamilton |
| 2007/0044445 A1 | 3/2007 | Spicer et al. |
| 2007/0079536 A1* | 4/2007 | Hall ............................ 40/299.01 |
| 2007/0152045 A1 | 7/2007 | Erickson et al. |
| 2007/0185749 A1* | 8/2007 | Anderson et al. ................. 705/7 |
| 2007/0222596 A1* | 9/2007 | Kleijn et al. ............... 340/572.1 |
| 2007/0285229 A1 | 12/2007 | Batra et al. |
| 2008/0074254 A1 | 3/2008 | Townsend et al. |
| 2008/0129497 A1* | 6/2008 | Woodard et al. ............... 340/540 |
| 2008/0220721 A1 | 9/2008 | Downie et al. |
| 2008/0297350 A1 | 12/2008 | Iwasa et al. |
| 2009/0042180 A1 | 2/2009 | Lafferty et al. |
| 2009/0070037 A1* | 3/2009 | Templeton et al. ............ 701/213 |
| 2009/0108997 A1* | 4/2009 | Petterson et al. ............. 340/10.1 |
| 2009/0128336 A1* | 5/2009 | Huang et al. ................ 340/572.1 |
| 2009/0319400 A1 | 12/2009 | Pratt |
| 2010/0283584 A1 | 11/2010 | McAllister |

FOREIGN PATENT DOCUMENTS

| | | |
|---|---|---|
| WO | WO 2004/023377 A1 | 3/2004 |
| WO | WO 2007/042327 A1 | 4/2007 |

* cited by examiner

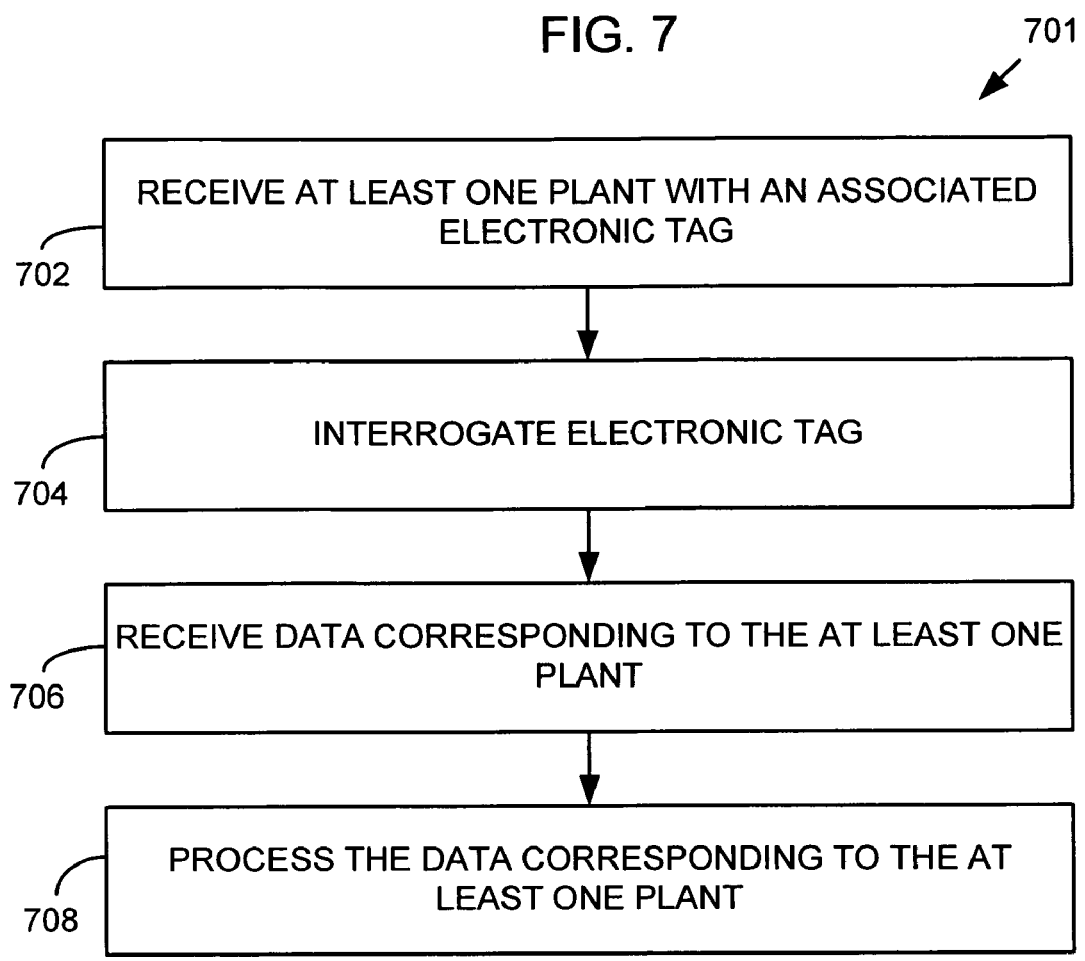

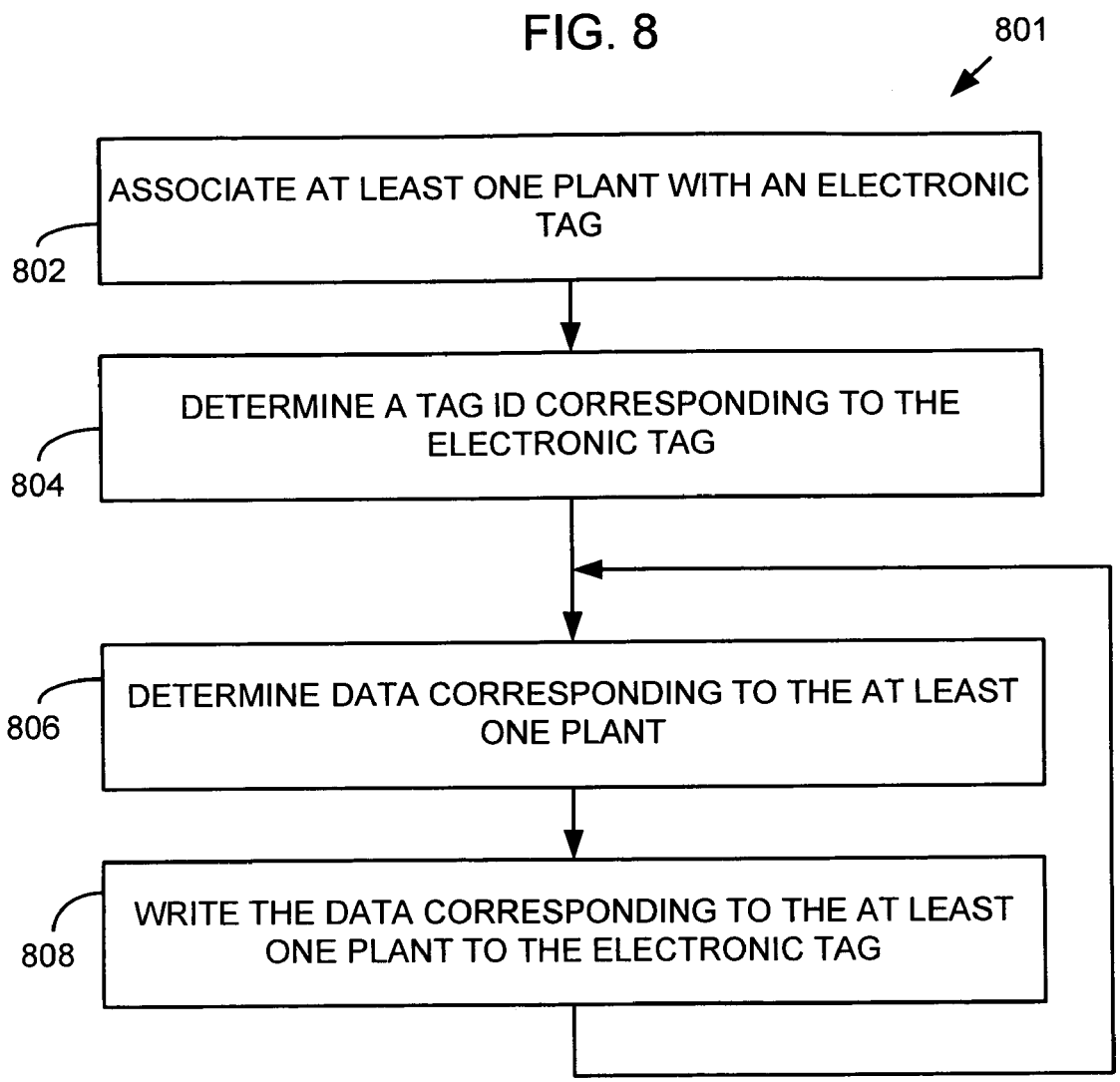

US 8,279,066 B2

METHOD AND APPARATUS FOR TRACKING PLANTS WITH ELECTRONIC TAG

SUMMARY

According to one aspect, an electronic tag may include a memory and an interrogation interface; and the memory may include data corresponding to information about one or more associated plants. The information may be structured, such as to enhance data parsing. The information may include plant care information such as plant care instructions and/or plant treatment history.

In one aspect, a method includes but is not limited to receiving at least one plant with an associated electronic tag, the electronic tag carrying data corresponding to care of the at least one plant and interrogating the electronic tag to receive the data. In another aspect, a method includes but is not limited to providing an electronic tag carrying data corresponding to care for at least one plant and physically associating the electronic tag with the at least one plant. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to an electronic tag interrogator to interrogate an electronic tag including a memory circuit and an interrogation interface; and the memory may include data corresponding to information about one or more associated plants. The system may include one or more remote resources for transmitting and processing data corresponding to data read from and/or written to the electronic tag. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not in any way limiting. Other aspects, features and advantages of the devices and/or processes and/or other subject matter described herein will become apparent in the teachings set forth herein.

BRIEF DESCRIPTION OF THE FIGURES

FIG. 7 is a flow chart illustrating a process for receiving at least one plant with an electronic tag and interrogating the electronic tag to receive data corresponding to the at least one plant, according to an embodiment.

FIG. 8 is a flow chart illustrating a process for associating an electronic tag with at least one plant and writing data to the electronic tag corresponding to information pertaining to the at least one plant, according to an embodiment.

The use of the same symbols in different drawings typically indicates similar or identical items.

DETAILED DESCRIPTION

Figure 1:
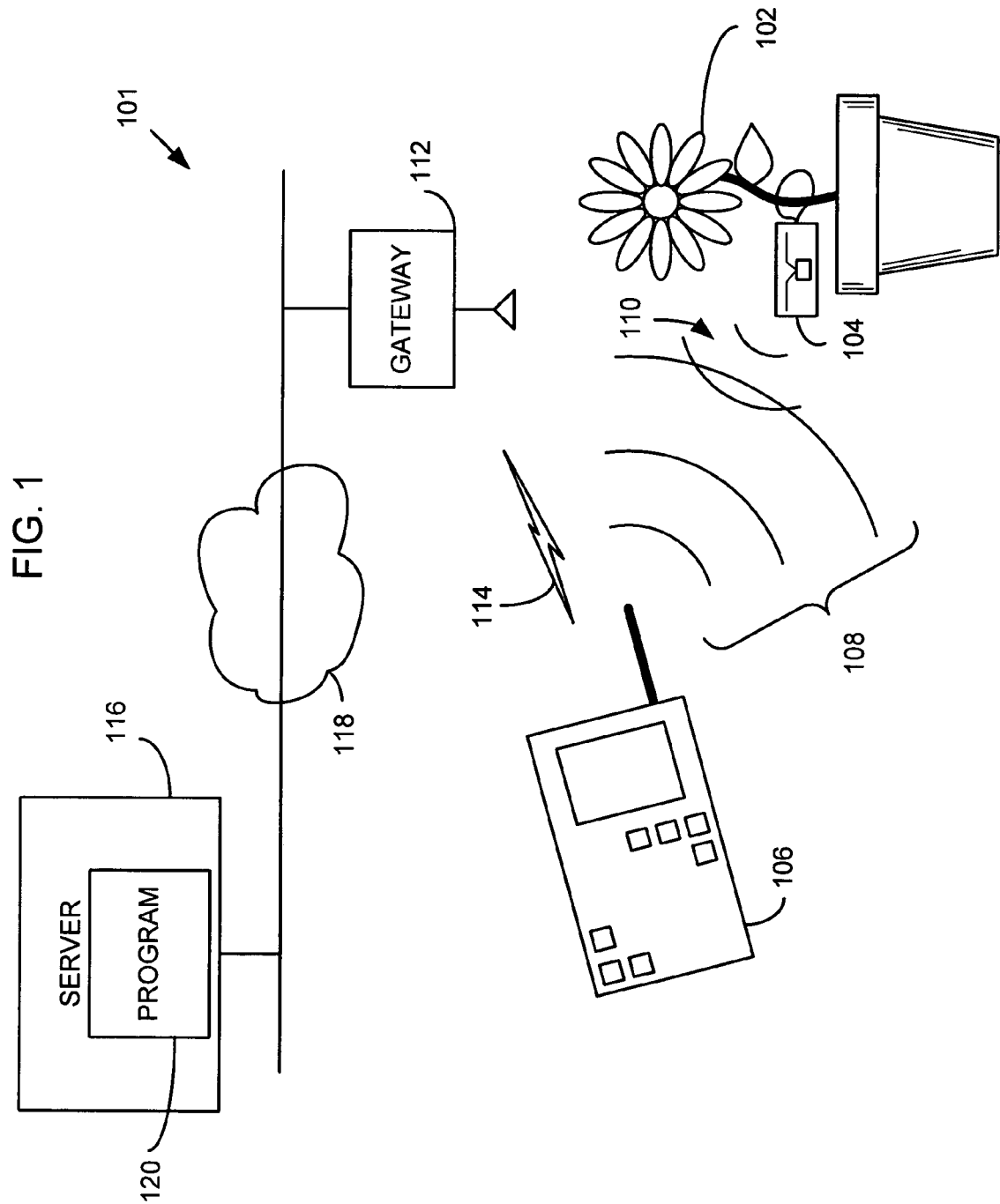
FIG. 1 is an illustrative diagram of a system and apparatuses for tracking one or more plants with an electronic tag, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for tracking data related to one or more plants 102 with an electronic tag 104, according to an embodiment. An electronic tag interrogator 106 may interrogate the electronic tag 104 to receive data corresponding to the plant 102. For example, the electronic tag interrogator 106 may comprise a radio frequency identification (RFID) interrogator that is configured to emit an interrogation field 108 comprising a radio frequency signal to illuminate one or more radio frequency tags (RF tags) 104. The interrogation field 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may comprise a gateway, host computer, etc. configured to communicate with the electronic tag interrogator 106 via a radio communication link 114.

According to an embodiment, the remote device 112 may be operatively coupled to a second remote device 116, such as a server, over a network 118. The second remote device 116 may provide a resource for running a computer program 120, the computer program 120 being operative to interact with data relayed from the electronic tag 104. For example, the computer program 120 may be operative to parse data from the electronic tag, a need for treatment may be assessed, the quality of care of the at least one plant may be assessed, a treatment device may be enabled, a treatment may be stopped, the data may be visually displayed, the data may be printed, the data may be presented via an audio output, etc.

According to another example, the computer program 120 may be operative to provide interrogation parameters to the interrogator 106. The interrogator 106 may, in turn, be operable to interrogate the electronic tag 104 using the interrogation parameters to access the data or access a subset of data stored in memory circuitry (not shown) of the electronic tag.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110.

While the at least one plant 102 is illustrated as a single plant in a pot, other forms are contemplated such as flats, rows, pallets, bare root, root ball, groupings, arrangements, beddings, gardens, etc.

Figure 2:
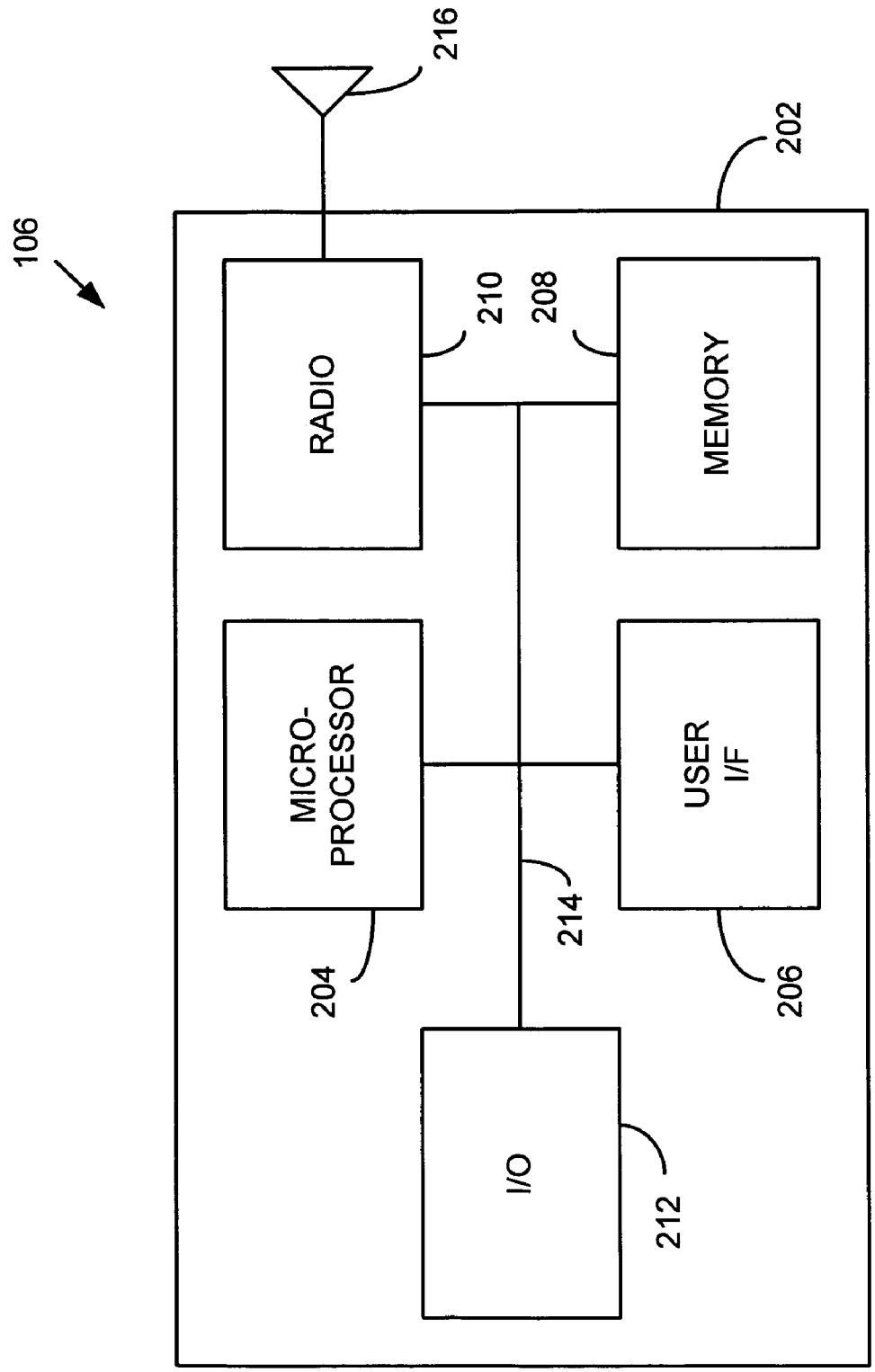
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse data pertaining to one or more plants from one or more RF tags. Additionally or alternatively, the interrogator 106 may be operable to transmit received data over the interface 212 to a remote processing resource (not shown), receive instructions from the remote processing resource, and modulate interrogation data over the RF tag illumination field produced by the one or more antennas 216, the interrogation data corresponding to the instructions received from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216, temporarily write received data to workspace in the memory 208, execute a program from memory 208 with the microprocessor 204 to parse received data to determine a plant treatment history such as the last time a plant was watered, compare the parsed data to an internal or network clock to determine an elapsed time since the treatment, perform a query of an external resource through the interface 212 to determine a nominal interval between the treatments, display the elapsed time since treatment, nominal treatment interval, and a recommendation regarding the treatment via a display portion of the user interface 206, receive an indication through the user interface 206 (such as a button press) to indicate an instance of the treatment has occurred, format data corresponding to the treatment, and write the formatted data over the radio 210 and at least one antenna 216 to the RF tag associated with the at least one plant (not shown) to record the treatment in the RF tag memory.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
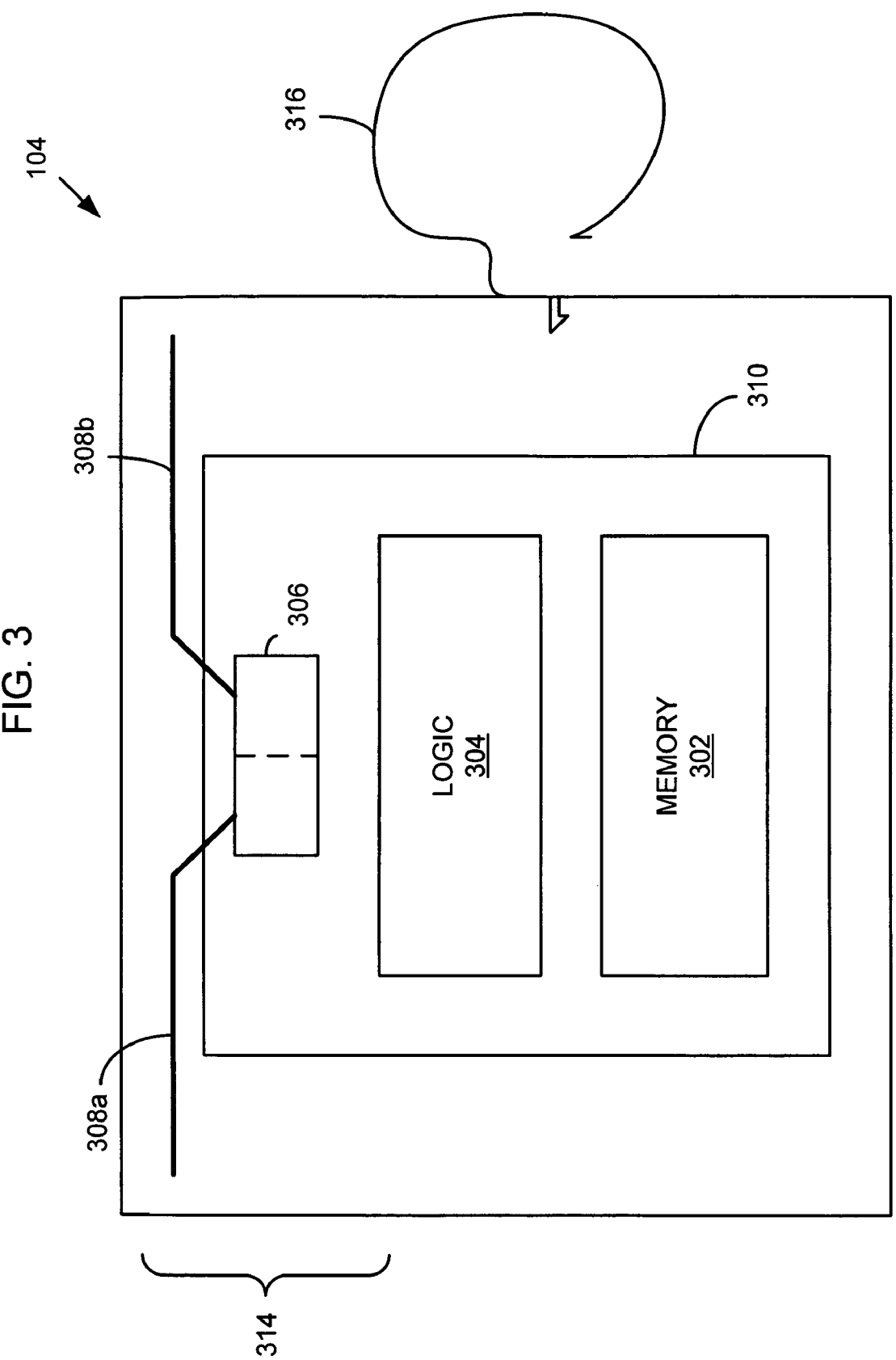
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a passive RF tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

According to an embodiment, the package 312 may include encapsulation or other form of protection for the circuitry and/or antenna. The package 312 may include a coupling 316 adapted to attachment to a plant (not shown). In the example of FIGS. 1 and 3, the coupling 316 may include a loop such as a "zip tie" that provides a permanent or semi-permanent association with a plant or a group of plants. According to an embodiment, the coupling 316 may be formed integrally with the package 312 for convenient attachment to one or more plants.

The antenna 308a, 308b, transceiver 306, and optionally a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown) may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 is illustrated diagrammatically as a memory map 401 in FIG. 4.

Figure 4:
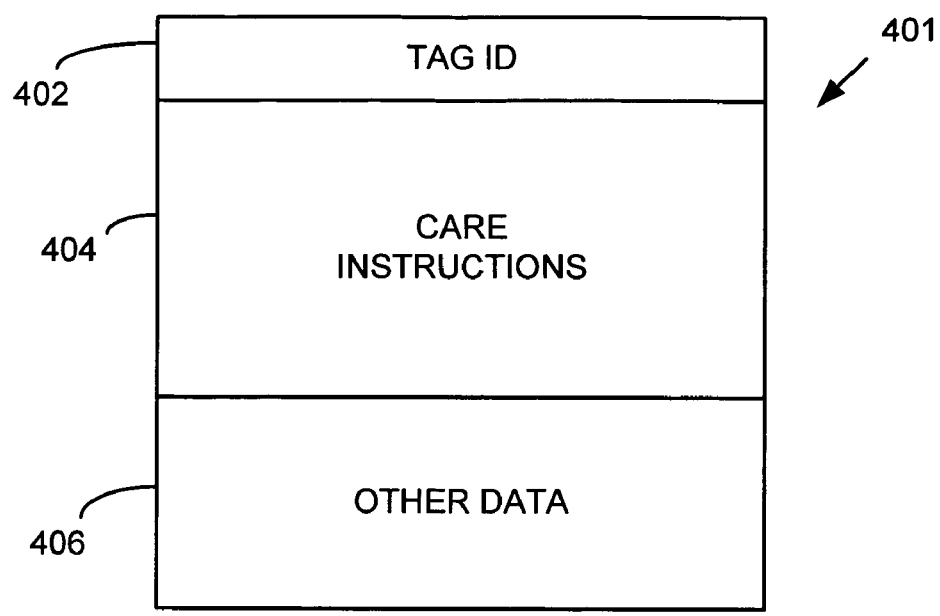
FIG. 4 is a diagram of memory contents of the electronic tag of FIG. 3, according to an embodiment.

Referring to FIG. 4, a memory diagram 401 shows three sections of data 402, 404, and 406 held within the electronic tag memory circuit 302, according to an embodiment. A first section of data (which may generally not be user-modifiable) is a tag identity 402. The tag identity may be encoded in a physically discontinuous portion of memory or may alternatively be encoded in a protected block of memory. A second section of memory 404 includes care information corresponding to one or more plants. In the example of FIG. 4, the second section of memory 404 includes plant care instructions. The data corresponding to plant care instructions may, for example, include a hexadecimal representation of plain language intended to inform a nursery, grower, transporter, retailer, gardener, and/or ultimate customer of the recommended conditions for growing the one or more plants. For example, plain language may include the instructions, "Full sun. Protect from freezing. Let roots dry between waterings. Fertilize moderately during spring."

The plant care instruction memory section 404 may include data corresponding to one or more region, geographical location, or climate zone, for example. The plant care instruction memory section 404 may also include data corresponding to one or more time intervals, such as an interval for application of treatments, an interval related to blooming, an interval related to propagation, an interval related to application of sun or light, etc. The plant care instruction memory section 404 may include data corresponding to watering instructions, sunlight instructions, planting instructions, fertilizing instructions, temperature instructions, type of soil instructions, soil pH instructions, pruning instructions, etc.

An optional third memory section 406 may include other data.

Figure 5:
FIG. 5 is a diagram of memory contents of the electronic tag of FIG. 3, according to another embodiment.

FIG. 5 is a diagram 501 of memory contents of the electronic tag memory 302 of FIG. 3, according to another embodiment. In addition to the tag ID 402 and other data 406 sections shown in FIG. 4, the memory contents 501 may include care information corresponding to one or more plants including a treatment record 502. For example, the treatment record 502 may include logged instances of receiving various treatments and/or information related to the source of the plant material.

For example, the treatment record 502 may include a series of data fields corresponding to a series of treatments such as " . . . T;water;1-1-2008;0630;015;T;water;1-1-2008;1400; 012; . . . " In this example, each instance of a treatment includes several data fields beginning with an indicator of a treatment record (T), indication of what treatment was applied (water), the date of application (Jan. 1, 2008), the time of the application (6:30 am and 2:00 pm, respectively), and the duration of the treatment (15 minutes and 12 minutes, respectively), with each data field being delimited by semicolons. Of course, this example may be simplified for ease of use, other field delimiters may be selected, treatment types may be coded, the fields may be entered in a different order, and/or other differences may occur.

Such a record of treatments may be written, for example, substantially in real time with application of the corresponding treatments. In such case, it may be advantageous to have the system (e.g. the computer program 120 or the interrogator 106 of FIG. 1) automatically generate a time code and/or duration code to avoid tampering. When read, the record of treatments may be used to assess the quality and consistency of care received by one or more plants, such as for quality assurance purposes, for assigning a value to the one or more plants, for diagnosing disease or determining preventive care, for determining safety parameters (such as if dangerous pesticides were used), for determining a holding period (for a pesticide to decompose), for optimizing future plant care, etc. In addition, the treatment record 502 may include additional data that may be grouped as part of the treatment record.

For example, the treatment record may include data corresponding to one or more of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, soil pH, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, packing date, etc.

An electronic tag may include a memory circuit whose contents include both care instructions 404 and a treatment record 502.

As may be appreciated, relatively sophisticated data parsing (such as even manual inspection by a human) may be necessary if data field entry is inserted in a freeform format. According to an embodiment, structured data may be used in place of or in addition to the examples of FIGS. 4 and 5.

Figure 6:
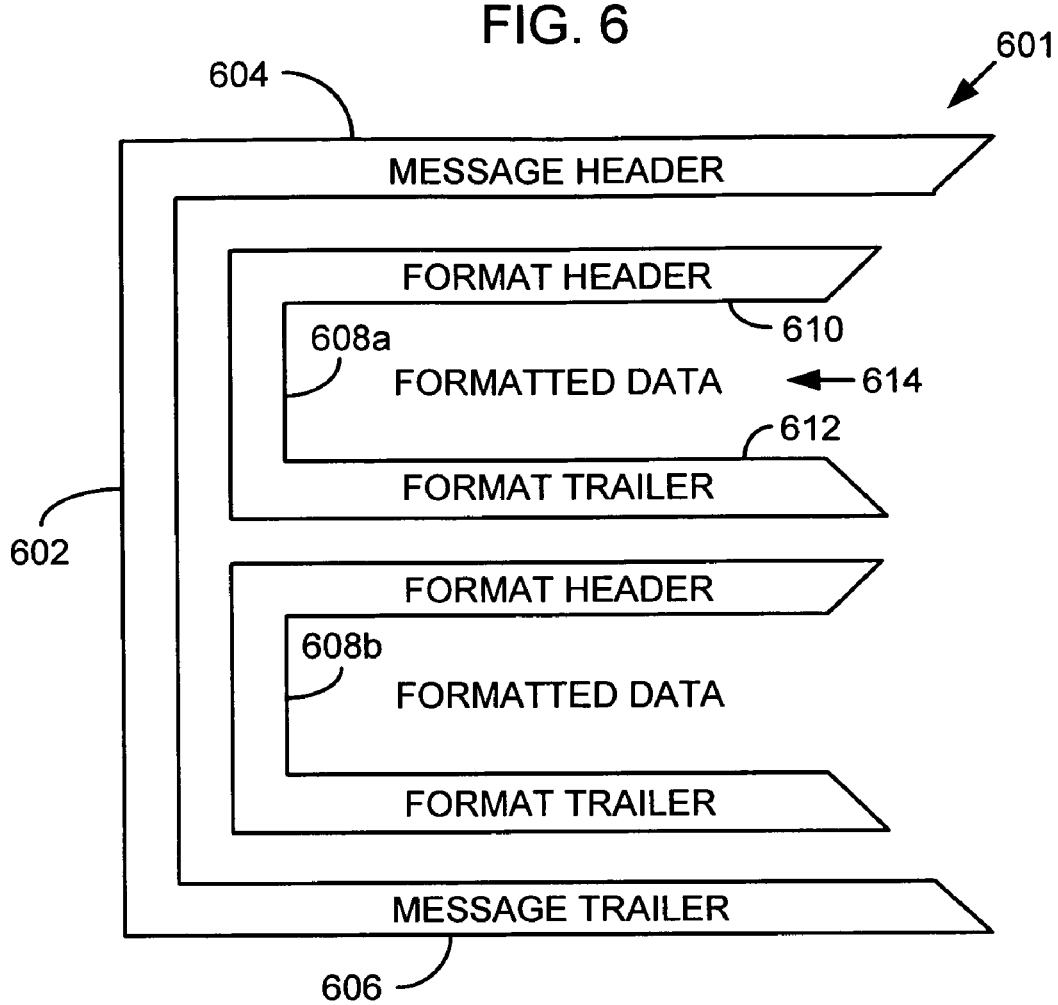
FIG. 6 is a diagram of a formatted data structure for the memory contents of the electronic tag of FIG. 3, according to an embodiment

FIG. 6 is a diagram 601 of structured data for the memory contents of the electronic tag of FIG. 3, according to an embodiment. According to an embodiment, structured data may include one or more envelope structures such as is specified, for example, by "ANSI MH10.8.3 Transfer Data Syntax for High Capacity ADC Media" and/or its revisions, published by the American National Standards Institute, and/or other standards published by other industry, national, or international standards bodies. According to an embodiment, structured data may include data field identification such as is, for example, specified by "ANSI MH10.8.2 Data Identifier and Application Identifier Standard" and/or its revisions, published by the American National Standards Institute, and/or other standards published by other industry, national, or international standards bodies.

Referring to FIG. 6, structured data may include a message envelope 602 that includes a message header 604 and a message trailer 606. According to one example, the message header 604 may include a representation of the ASCII characters "[)>$^R{}_S$", where "$^R{}_S$" stands for the ASCII record separator character (hexadecimal 1E). According to convention, the string "[)>" is chosen to indicate the beginning of a structured data message, and is chosen because of the rarity of a happenstance encounter of the character combination in user data. The symbol "$^R{}_S$" may be chosen for separation of discrete data groups forming format envelopes (described below). The message trailer 606 may be encoded as "$^E{}O_T$", where "$^E{}O_T$" stands for the ASCII end-of-transmission character (hexadecimal 04).

Optionally, within the message envelope that begins with the message header 604 and message trailer 606, one or more format envelopes 608a, 608b may be present. Each format envelope 608a, 608b begins with a format header 610 and a format trailer 612. According to an embodiment, the format header may be "03$^F{}_S{}^G{}_S{}^U{}_S$03030" in the case of an X12 segment format, or "06$^G{}_S$" in the case of a data identifier format, or "05$^G{}_S$" in the case of an application identifier format, for example; where "$^F{}_S$" stands for the ASCII file separator character (hexadecimal 1C), "$^G{}_S$" stands for the ASCII group separator character (hexadecimal 1D), and "$^U{}_S$" stands for the ASCII unit separator character (hexadecimal 1F). According to the message header example given above, the format trailer 612 may be the character "$^R{}_S$".

Within the one or more format envelopes 608b, formatted data may be present. For example, for data identifier formatted data, an ANSI MH10.8.2 "Z" identifier for "mutually defined between customer and supplier" may precede an alphanumeric code for each instance of a treatment and/or care instructions. Alternatively, an industry standards group may assign data identifiers within ANSI MH10.8.2 Data Identifier and Application Identifier Standard Category 14 for similar use.

According to an embodiment, a new data structure or portion of a data structure such as structure 601 may be written to an electronic tag each time a treatment and/or recordation of care instructions occurs. In such a case, the new data structure or data structure portion may simply be appended to previous data. Thus a plurality of message envelopes 602, format envelopes 608a, 608b, or other structural devices may be present in the memory of an electronic tag.

According to an example, a treatment record data region may be encoded (in alphanumeric form) as "[)>$^R{}_S$06$^G{}_S$ZAA01-01-2008;0630;015;$^R{}_S{}^E{}O_T$[)>$^R{}_S$06$^G{}_S$ZAA01-01-2008;1400;012$^R{}_S{}^E{}O_T$". Thus, there are two message envelopes, each starting with the characters "[)>$^R{}_S$" and ending with the character "$^E{}O_T$", the second message envelope having been appended to the first message envelope.

In this example, each message header "[)>$^R{}_S$" is followed by a format header "06$^G{}_S$". A mutually-agreed data identifier "Z" is followed by mutually-agreed upon syntax "AA", to indicate a watering treatment field, the first message envelope provides a record of water treatment in the water treatment field "01-01-2008;0630;015;" indicating that the at least one plant was watered for 15 minutes on Jan. 1, 2008 beginning at 6:30 am (the semicolons are illustrative of an agreed-upon data structure for a data field constructed from a plurality of elements). A "$^R{}_S$" indicates the end of the format envelope and a "$^E{}O_T$" indicates the end of the message envelope. In the second message, a message header "[)>$^R{}_S$" is again followed by a format header "06$^G{}_S$" and "ZAA" to indicate a mutually-agreed data structure to indicate watering of the at least one plant. The data "01-01-2008;1400;012" corresponds to watering the at least one plant for 12 minutes on Jan. 1, 2008 beginning at 2:00 pm. A "$^R{}_S$" indicates the end of the format envelope and a "$^E{}O_T$" indicates the end of the second message envelope.

According to another embodiment, a data structure may be read and rewritten at each instance of treatment or care instruction recordation. For example, for an electronic tag having one message envelope and format envelope holding a treatment record; the tag may be read to determine the current data; the "$^R{}_S{}^E{}O_T$", corresponding to the format trailer 612 and message trailer 606, respectively may be deleted or overwritten with a new data element corresponding to the instant treatment; a new data field corresponding to the instant treatment may be written; and an "$^R{}_S{}^E{}O_T$" may be newly written following the last data field to signify the format trailer 612 and message trailer 606, respectively.

For a treatment logging example, a treatment record data region may be encoded (in alphanumeric form) as "[)>$^R{}_S$06$^G{}_S$ZAA01-01-2008;0630;015;$^G{}_S$ZAA01-01-2008;1400;012$^R{}_S{}^E{}O_T$". In this example, the message header "[)>$^R{}_S$" is followed by a format header "06$^G{}_S$". A mutually-agreed data identifier "Z" is followed by mutually-agreed upon syntax "AA", to indicate a watering treatment field, the first water treatment field "01-01-2008;0630;015;" indicates that the at least one plant was watered for 15 minutes on Jan. 1, 2008 beginning at 6:30 am (the semicolons are presumed to be within the agreed-upon data structure). A group separator "$^G{}_S$" indicates the end of the field. A second watering treatment field is coded as "ZAA01-01-2008;1400;012", corresponding to watering the at least one plant for 12 minutes on Jan. 1, 2008 beginning at 2:00 pm. A "$^R{}_S$" indicates the end of the format envelope and a "$^E{}O_T$" indicates the end of the message envelope.

Of course, the physical memory may be actually coded as hexadecimal or octal equivalent data to the alphanumeric examples. According to some embodiments, the message envelope structure 602 and/or the format envelope structure 608a, 608b may be omitted and the structured data may be present as a sequence of data elements identified by application data identifiers, each encoding a treatment and/or as a sequence of treatment records identified by an application data identifier.

According to some embodiments, an application data identifier specific to data related to one or more plants may identify data that is not specifically plant care (e.g., plant care instructions or plant treatment record) related. For example, a plant application data identifier may identify a species, hybrid, genotype, phenotype, or other data relevant to at least one plant. As used herein, the term plant care information shall be understood to extend to other such data related to at least one plant with which an electronic tag is associated.

According to another embodiment, structured data may include data field identification such as is, for example, an embedded data tag other than an industry-specified application data identifier. For example a delimited data field for a watering event may be encoded as "[WATER01]", and a data field for a sensed soil pH may be encoded as "[SOILPH02]". According to an example, the respective "01" and "02" portions of the watering event and sensed soil pH data tags may indicate a data format variant of encoded data of the respective type, a revision level of a data format, etc. According to an example, a portion of structured data using embedded data tags may include, " . . . [WATER01]01-01-2008;0630;015

[WATER01]01-01-2008;1400;012[SOILPH02]01-01-2008; 6.7[WATER01]01-02-2008 . . . ". In this example, the first data field is identified as beginning immediately after the first "[WATER01]" data tag and proceeds until the next delimited data tag is encountered, which in the example is another "[WATER01]" data tag. The second data field then follows immediately after the second "[WATER01]" data tag and proceeds until the next delimited data tag is encountered, which in the example is a "[SOILPH02]" data tag.

Thus, various types of data structuring are contemplated for packing plant-related or plant care payload data into a corresponding electronic tag.

FIG. 7 is a flow chart illustrating a process 701 for receiving at least one plant with an electronic tag and interrogating the electronic tag to receive data corresponding to the at least one plant, according to an embodiment. In FIG. 7 and in following figures that include various examples of operational flows, discussion and explanation may be provided with respect to the above-described examples of FIGS. 1-6, and/or with respect to other examples and contexts. However, it should be understood that the operational flows may be executed in a number of other environments and contexts, and/or in modified versions of FIGS. 1-6. Also, although the various operational flows are presented in the sequence(s) illustrated, it should be understood that the various operations may be performed in other orders than those which are illustrated, or may be performed concurrently.

In step 702, at least one plant is received along with at least one electronic tag associated with the plant. According to embodiments, the at least one electronic tag may be physically associated with the at least one plant.

Proceeding to step 704, the electronic tag is interrogated. According to embodiments, the electronic tag may include a RF tag such as a passive radio frequency tag, an active radio frequency tag, a backscatter radio frequency tag, a half-duplex radio frequency tag, or a full-duplex radio frequency tag; a touch memory device; a proximity card; a photonic tag; a smart card; etc. Accordingly, interrogating the electronic tag may include performing radio frequency interrogation; performing touch memory interrogation, performing proximity card interrogation, performing photonic tag interrogation, performing smart card interrogation, etc.

Proceeding to step 706, data corresponding to the at least one plant is received from the electronic tag. According to an embodiment, the data may include data corresponding to instructions for care of the at least one plant. The data corresponding to plant care instructions may include data corresponding to watering instructions, sunlight instructions, planting instructions, fertilizing instructions, temperature instructions, pruning instructions, etc.

According to an embodiment, data corresponding to the at least one plant may include data corresponding to a record of treatments received by the at least one plant. For example, data corresponding to a record of treatments received by the at least one plant may include seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil pH, soil temperature, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, packing date, etc.

According to an embodiment, the data corresponding to the at least one plant may include structured data. Such structure data may include at least one data identifier corresponding to a record of at least one previous treatment. The structured data may include at least one application data identifier and/or data tag corresponding to instructions for care of the at least one plant. The at least one application data identifier and/or data tag may correspond to an industry-assigned code corresponding to at least one data field carrying the data corresponding to the at least one plant. The structured data may include a data envelope structure including data corresponding to the at least one plant including the care of the at least one plant. Care of at least one plant may include a history of treatments received and/or instructions for plant care.

Proceeding to optional step 708, the data may be processed. For example the data may be parsed, a need for treatment may be assessed, the quality of care of the at least one plant may be assessed, a treatment device may be enabled, a treatment may be stopped, the data may be visually displayed, the data may be printed, the data may be presented via an audio output, etc.

FIG. 8 is a flow chart illustrating a process 801 for associating an electronic tag with at least one plant and writing data to the electronic tag corresponding to information pertaining to the at least one plant, according to an embodiment. In step 802, an electronic tag is associated with at least one plant. According to an embodiment, the electronic tag may be physically associated with the at least one plant in a permanent or semi-permanent way such that the tag remains associated with the plant during a sequence of movements of the plant or plants. For example, as shown in FIG. 3, the electronic tag 104 may include an attachment feature 316 that may be looped around a stem of a plant and securely fastened into the body of the electronic tag, such as in the manner of a zip tie.

According to embodiments, physically associating the electronic tag with at least one plant may include attaching the electronic tag to the exterior or the at least one plant, at least partially embedding the electronic tag within the at least one plant, attaching the electronic tag to a container of the at least one plant, disposing the electronic tag on or within the soil physically associated with the at least one plant, etc.

Proceeding to step 804, the tag identification or tag ID may be determined. The tag ID is a unique identification that may, for example, include a plurality of ASCII characters. In some embodiments, the tag ID may be hard coded or "locked" into the tag memory at the time of manufacture, and thus may be determined by interrogating the electronic tag 104. In other embodiments, the electronic tag 104 may be blank when delivered, and the tag ID may be determined by incrementing a counter, looking up an unassigned ID in a database, generating a random or pseudo-random number, or otherwise establishing a string of bits or characters that is then written to the electronic tag to uniquely or quasi-uniquely identify the electronic tag. By extension, the tag ID may then be used to uniquely or quasi-uniquely identify the at least one plant with which it is associated.

Of course, steps 802 and 804 may be reversed without departing from the scope of the process 801. In some embodiments, such as when the electronic tag is embodied as a touch memory device for example, the assignment and/or determination of a tag ID may be omitted. In such cases, addressing or interrogating the electronic tag may typically be by physical contact, making the use of a tag ID unnecessary for establishing an unambiguous communication relationship with an interrogator 106.

Proceeding to step 806, data corresponding to the at least one plant 102 is determined. For example, plant care instructions corresponding to the at least one plant may be entered via a keyboard, looked up in a database, etc. An example of such data is described above in conjunction with FIGS. 4 and 6. Or for example, a treatment such as watering, fertilizing, etc. may be applied to the at least one plant, and treatment record data may be generated as a function of the type of treatment, duration, amount, etc. Such action-responsive data determination may, according to some embodiments, be considered a log entry pertaining to the treatments applied to or received by the at least one plant 102. An example of treatment record data is described above in conjunction with FIGS. 5 and 6.

Proceeding to step 808, the data corresponding to at least one plant 102 is written to the electronic tag 104.

Optionally, the process 801 may loop back to step 806, and additional, supplemental, or replacement data may be determined for writing to the electronic tag. Writing additional data to the electronic tag may involve reading the at least one plant-specific data previously written to the tag and then writing new data to the electronic tag.

For example, the previous data may be read to determine a next address, sector, block, etc. available for writing the new data, and the new data may be written to the determined address, sector, block, etc. In such cases, the new data may be flagged to supersede the previous data or may substantially function as incremental data, with the new data working in combination with one or more sets of previous data to determine a complete record of the plant data.

According to another example, the previous data may be read to determine its content. The content of the previous data may be discarded or combined with new information to generate new data. The previous data may then be deleted, bypassed or overwritten by the new data.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for receiving plant care information, comprising:
   receiving at least one plant with an associated electronic tag, the electronic tag carrying data corresponding to care of the at least one plant;
   interrogating the electronic tag to receive the data;
   parsing the received data to determine a treatment history of the at least one plant;
   comparing the parsed data to an internal or network clock to determine an elapsed time since a treatment; and
   displaying a treatment recommendation.

2. The method of claim 1, wherein the electronic tag includes at least one selected from the group consisting of a radio frequency tag, a passive radio frequency tag, an active radio frequency tag, a backscatter radio frequency tag, a half-duplex radio frequency tag, a full-duplex radio frequency tag, a touch memory device, a proximity card, a photonic tag, and a smart card.

3. The method of claim 1, wherein interrogating the electronic tag to receive the data includes performing radio frequency interrogation; performing touch memory interrogation, performing proximity card interrogation, performing photonic tag interrogation, and performing smart card interrogation.

4. The method of claim 1, wherein the data corresponding to the plant care information includes data corresponding to a record of treatments received by the at least one plant.

5. The method of claim 4, wherein the data corresponding to the record of treatments includes data corresponding to at least one selected from the group consisting of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, air temperature, light intensity, light duration, light schedule, soil pH, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

6. The method of claim 1, wherein the data corresponding to the plant care information includes data corresponding to plant care instructions for the at least one plant.

7. The method of claim 6, wherein the data corresponding to plant care instructions includes data corresponding to at least one selected from the group consisting of watering instructions, sunlight instructions, planting instructions, fertilizing instructions, temperature instructions, type of soil instructions, soil pH instructions, and pruning instructions.

8. The method of claim 6, wherein the data corresponding to plant care instructions includes data corresponding to one or more region or geographical location.

9. The method of claim 6, wherein the data corresponding to plant care instructions includes data corresponding to one or more time intervals.

10. A method for receiving plant care information, comprising:
receiving at least one plant with an associated electronic tag, the electronic tag carrying structured data corresponding to care of the at least one plant;
interrogating the electronic tag to receive the data;
parsing the received data to determine a treatment history of the at least one plant;
assessing a need for a treatment of the at least one plant from the parsed data; and
performing a query of an external resource to determine a nominal interval for a recommended treatment for the at least one plant.

11. The method of claim 10 wherein the data includes structured data including at least one application data identifier or data tag corresponding to a record of at least one previous treatment.

12. The method of claim 10 wherein the data includes structured data including at least one application data identifier or data tag corresponding to instructions for care of the at least one plant.

13. The method of claim 10 wherein the data includes structured data including at least one application data identifier corresponding to an industry-assigned code corresponding to at least one data field carrying the data corresponding to care of the at least one plant.

14. The method of claim 10, further comprising:
processing the parsed data.

15. The method of claim 14 wherein processing the parsed data includes at least one selected from the group consisting of printing the processed data, visually displaying the processed data, and providing an audio presentation of the processed data.

16. A system for providing plant care information, comprising:
an electronic tag interrogator configured to interrogate an electronic tag associated with at least one plant;
an electronic controller operatively coupled to the electronic tag interrogator and configured to receive electronic tag data; and
a software program configured to run on the electronic controller and configured to parse the electronic tag data to receive data corresponding to care of the at least one plant, to assess a need for a treatment of the at least one plant from the parsed data, and to output plain language care instructions for the at least one plant at least partially based on the treatment assessment;
a computer network configured to carry a communication signal between the electronic tag interrogator and the electronic controller; and
wherein the electronic controller includes a server coupled to the computer network.

17. The system of claim 16, wherein the electronic tag interrogator is configured to interrogate at least one selected from the group consisting of a radio frequency tag, a passive radio frequency tag, an active radio frequency tag, a backscatter radio frequency tag, a half-duplex radio frequency tag, a full-duplex radio frequency tag, a touch memory device, a photonic tag, and a smart card.

18. The system of claim 16 wherein the electronic controller includes a microprocessor embedded in the electronic tag interrogator.

19. The system of claim 16, further comprising:
a communication interface between the electronic tag interrogator and the electronic controller.

20. A system for providing plant care information, comprising:
an electronic tag interrogator configured to interrogate an electronic tag associated with at least one plant;
an electronic controller operatively coupled to the electronic tag interrogator and configured to receive electronic tag data; and
a software program configured to run on the electronic controller, the software program including a data parsing module configured to recognize a structured data format and to parse the electronic tag data to determine a treatment history of the at least one plant and compare the parsed data to an internal or network clock to determine an elapsed time since a treatment of the at least one plant.

21. The system of claim 20, wherein the data parsing module is configured to recognize a data header in the electronic tag data.

22. The system of claim 20, wherein the data parsing module is configured recognize an application data identifier or a data tag in the electronic tag data.

23. The system of claim 20, wherein:
the data parsing module is configured to generate a data field request for a data field corresponding to the care for the at least one plant, and receive the data field;
wherein the electronic controller is configured to transmit the data field request to the electronic tag interrogator, and receive the requested data field from the electronic tag interrogator; and
wherein the electronic tag interrogator is configured to receive the data field request from the electronic tag interrogator, interrogate the electronic tag to retrieve the requested data field, and transmit the requested data field to the electronic controller.

24. A system for providing plant care information, comprising:
an electronic tag interrogator configured to interrogate an electronic tag associated with at least one plant;
an electronic controller operatively coupled to the electronic tag interrogator and configured to receive electronic tag data;
a software program configured to run on the electronic controller and configured to parse the electronic tag data to determine a treatment history of the at least one plant, and to compare the parsed data to an internal or network clock to determine an elapsed time since a treatment of the at least one plant, the software program further configured to query an external resource to determine a nominal interval between treatments of the at least one plant and to display a recommended treatment of the at least one plant in response to the comparison of the parsed data and the query; and
a plurality of the electronic tags associated with a corresponding plurality of instances of the at least one plant, the electronic tags including memory circuitry holding structured data including data corresponding to the plant care information.

25. The system of claim 24, wherein the data corresponding to the plant care information includes data corresponding to a record of treatments received by the at least one plant.

26. The system of claim 25, wherein the data corresponding to the record of treatments includes data corresponding to at least one selected from the group consisting of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, air temperature, light intensity, light duration, light schedule, soil pH, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

27. The system of claim 25, wherein the data corresponding to plant care instructions includes data corresponding to one or more region or geographical location.

28. The system of claim 25, wherein the data corresponding to plant care instructions includes data corresponding to at least one selected from the group consisting of watering instructions, sunlight instructions, planting instructions, fertilizing instructions, temperature instructions, soil type instructions, soil pH instructions, and pruning instructions.

29. A method for associating plant care information with at least one plant, comprising:
providing an electronic tag carrying data corresponding to care for at least one plant;
physically associating the electronic tag with the at least one plant;
after physically associating the electronic tag with the at least one plant,
interrogating the electronic tag to receive the data;
parsing the received data to determine a treatment history of the at least one plant;
assessing a need for a treatment by comparing the parsed data to an internal or network clock to determine an elapsed time since a treatment;
displaying a recommended treatment at least partially based on the treatment assessment; and
writing data to the electronic tag to record data in a memory of the electronic tag corresponding to the time and type of the treatment applied to the at least one plant.

30. The method of claim 29, wherein the electronic tag includes at least one selected from the group consisting of a radio frequency tag, a passive radio frequency tag, an active radio frequency tag, a backscatter radio frequency tag, a half-duplex radio frequency tag, a full-duplex radio frequency tag, a touch memory device, a proximity card, and a smart card.

31. The method of claim 29, further comprising writing the data corresponding to the care for the at least one plant to the electronic tag through an interrogation interface.

32. The method of claim 29, further comprising writing the data corresponding to the care for the at least one plant to the electronic tag through an interrogation interface selected from the group consisting of a radio frequency interrogation interface; a touch memory interrogation interface, a proximity card interrogation interface, and a smart card interrogation interface.

33. The method of claim 29, wherein the data includes data corresponding to instructions for care of the at least one plant.

34. The method of claim 29, wherein the data corresponding to the plant care information includes data corresponding to a record of treatments received by the at least one plant.

35. The method of claim 34, wherein the data corresponding to the record of treatments includes data corresponding to at least one selected from the group consisting of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, air temperature, light intensity, light duration, light schedule, soil pH, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

36. The method of claim 29, wherein the data corresponding to the plant care information includes data corresponding to plant care instructions for the at least one plant.

37. The method of claim 36, wherein the data corresponding to plant care instructions includes data corresponding to at least one selected from the group consisting of watering instructions, sunlight instructions, planting instructions, fertilizing instructions, temperature instructions, soil type instructions, soil pH instructions, and pruning instructions.

38. The method of claim 36, wherein the data corresponding to plant care instructions includes data corresponding to one or more region or geographical location.

39. The method of claim 36, wherein the data corresponding to plant care instructions includes data corresponding to one or more time intervals.

40. A method for associating plant care information with at least one plant, and treating the at least one plant, comprising:
   providing an electronic tag carrying structured data corresponding to care for the at least one plant;
   physically associating the electronic tag with the at least one plant;
   parsing the structured data to determine a treatment history of the at least one plant;
   comparing the parsed data to an internal or network clock to determine an elapsed time since a treatment;
   performing a query of an external resource to determine a nominal interval between treatments of the at least one plant;
   applying a treatment to the at least one plant corresponding to the elapsed time since a treatment and the nominal interval; and
   writing data to the electronic tag to record data in a memory of the electronic tag corresponding to the time and type of the treatment applied to the at least one plant.

41. The method of claim 40 wherein the structured data includes at least one application data identifier or data tag corresponding to a record of at least one treatment.

42. The method of claim 40 wherein the structured data includes at least one application data identifier or data tag corresponding to instructions for care of the at least one plant.

43. The method of claim 40 wherein the structured data includes at least one data identifier corresponding to an industry-assigned code corresponding to at least one data field carrying the data corresponding to care of the at least one plant.

44. The method of claim 29, wherein providing an electronic tag carrying data corresponding to the care for at least one plant includes providing the electronic tag and writing the data corresponding to the care for the at least one plant to the electronic tag through an interrogation interface.

45. The method of claim 29, wherein providing an electronic tag carrying data corresponding to the care for at least one plant includes receiving the electronic tag including the data corresponding to the care for the at least one plant.

46. The method of claim 29, further comprising:
   providing at least one treatment to the at least one plant; and
   wherein providing an electronic tag carrying data corresponding to the care for at least one plant includes providing the electronic tag and writing data corresponding to the at least one treatment provided the at least one plant to the electronic tag through an interrogation interface.

47. The method of claim 29, wherein physically associating the electronic tag with the at least one plant includes attaching the electronic tag to the exterior of the at least one plant.

48. The method of claim 29, wherein physically associating the electronic tag with the at least one plant includes at least partially embedding the electronic tag within the at least one plant.

49. The method of claim 29, wherein physically associating the electronic tag with the at least one plant includes attaching the electronic tag to a container of the at least one plant.

50. The method of claim 29, wherein physically associating the electronic tag with the at least one plant includes disposing the electronic tag on or within soil physically associated with the at least one plant.

\* \* \* \* \*